United States Patent [19]

Sierk

[11] Patent Number: 4,879,816
[45] Date of Patent: Nov. 14, 1989

[54] COMBINATION RANGE POLE AND BUBBLE-LEVEL THEREFOR

[76] Inventor: Anthony H. Sierk, 904 Palm Trail, Delray Beach, Fla. 33483

[21] Appl. No.: 261,095

[22] Filed: Oct. 24, 1988

[51] Int. Cl.⁴ ............................................. G01C 15/06
[52] U.S. Cl. .................................................... 33/295
[58] Field of Search ................ 33/293, 294, 295, 296, 33/370, 371, 392, 365, 809

[56] References Cited

U.S. PATENT DOCUMENTS

| | | | |
|---|---|---|---|
| 723,351 | 3/1903 | Abbee | 33/353 |
| 2,096,638 | 10/1937 | Higgins | 33/365 X |
| 2,245,901 | 6/1941 | Chaskin | 33/295 |
| 2,794,263 | 6/1957 | Cranmer | 33/392 X |
| 2,972,415 | 2/1961 | Rensch | 211/144 X |
| 3,595,209 | 7/1971 | Parker | 248/200.1 X |
| 3,855,710 | 12/1974 | Lunden | 33/295 |

FOREIGN PATENT DOCUMENTS 560266 4/1957 Italy ................................... 33/296

Primary Examiner—Harry N. Haroian
Attorney, Agent, or Firm—Victor F. Volk

[57] ABSTRACT

A surveyors' range pole comprises a bubble level that is attached to the web of a length of channel. When the pole sections are assembled a threaded pin of one of the sections is passed through a hole in the web, locking the channel between two sections.

8 Claims, 2 Drawing Sheets

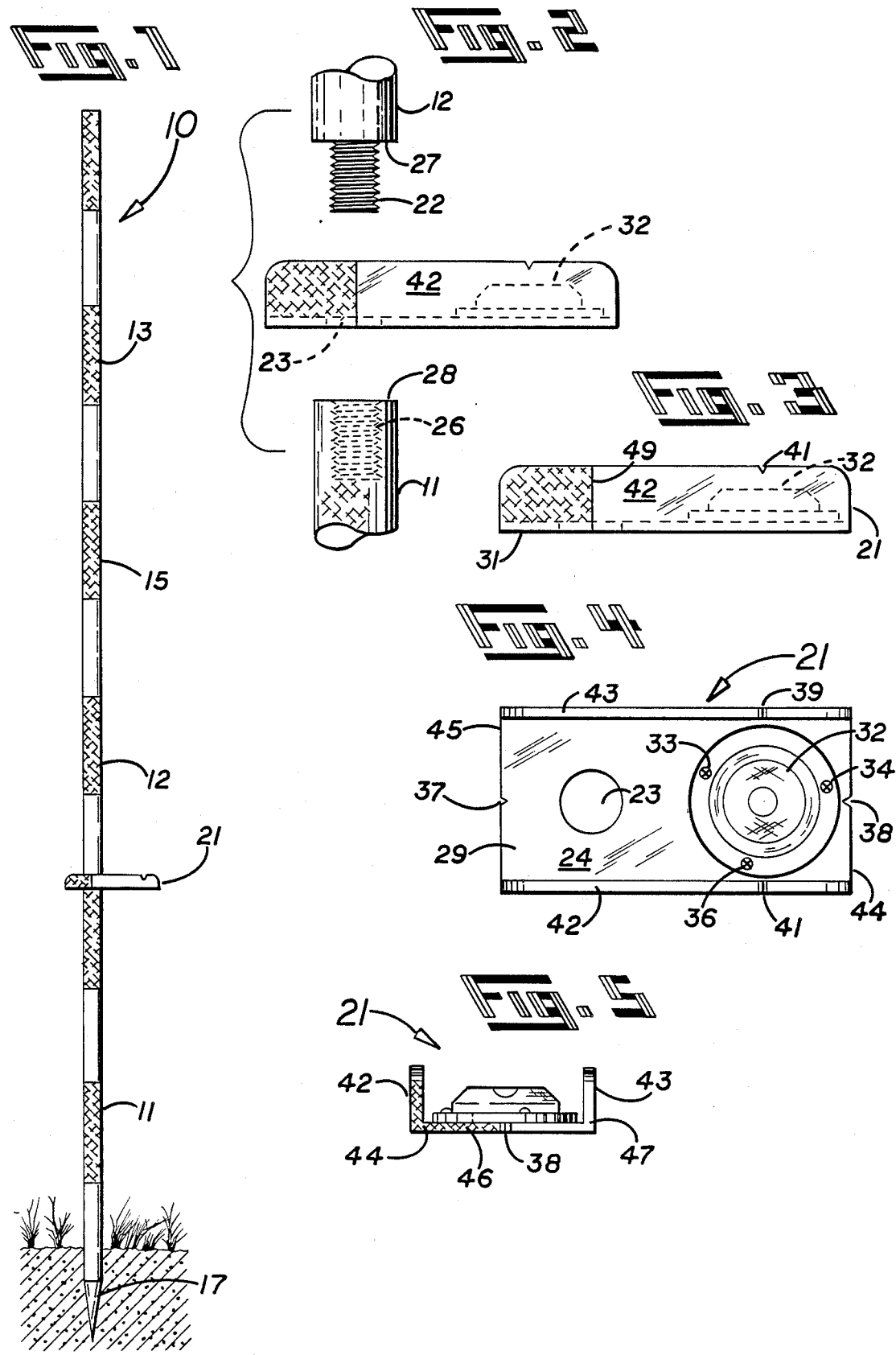

4,879,816

COMBINATION RANGE POLE AND BUBBLE-LEVEL THEREFOR

BACKGROUND OF THE INVENTION

Surveyors' range poles are now widely standardized to come in four-foot sections, each with a threaded pin on one end and a threaded hole at the other. These short lengths can be conveniently carried in a small truck or car and can be connected together to construct a pole of any required height. A sharp tapered steel point can be threaded to the bottom section for insertion of the pole into sod, and mounting tripods are commercially available for terrain that cannot be penetrated by the steel point. Commonly, the same man will set the pole and man the transit from different sites. A conventional way of determining that the pole is vertical in the line of sight is to align it visually against the string of a plumb bob. But this does not assure the that the pole will be vertical from another line of sight.

Sections of range pole are available with built-in bubble levels and one of these sections may be included in the pole when it is set up. But such sections are relatively expensive and must be entirely replaced upon any damage to the bubble.

In patent 2584586 Frazier suggests the inclusion of recesses for bubble levels in an impregnated softwood beam that may be used as a surveyors' rod. Frazier's rod is not sectionalized and replacement of a damaged level would put the rod out of service.

Chaires patent 4146969 describes a rod section that includes a built-in level, as mentioned above.

Lunden patent 3855710 describes a bracket that can be bolted to a rod to support a circular centering level.

SUMMARY OF THE INVENTION

I have invented a combination of a sectionalized range pole and bubble-level indicating device therefor which comprises a plurality of pole sections, each of which comprises two flat end surfaces that are normal to the long axis of the section. The sections each also comprises a threaded extension central to one of these surfaces and a matching threaded opening central to the other surface. My combination also comprises a bubble level supporting member such, advantageously, as a channel, which has opposing flat parallel faces with a hole through them through which the extension passes. At the same time the faces of the supporting member press against the surfaces of the section ends and a bubble-level is mounted on it.

Advantageously, the bubble-level and the channel hole will be aligned centrally of the channel the web and flanges of which will comprise notches for guiding a plumb line. The edges of the web of the channel and the sides of the flange are coded in contrasting colors on either side of a line marking the center line of the hole.

BRIEF DESCRIPTION OF THE DRAWING

FIG. 1 is an elevation of the combination of my invention, with the ground in section.

FIG. 2 is an exploded elevation of a joint in the combination of FIG. 1.

FIG. 3 is a side view of the channel of my combination.

FIG. 4 is a plan view of the channel of FIG. 3.

FIG. 5 is a front view of the channel of FIG. 3.

DETAILED DESCRIPTION OF PREFERRED EMBODIMENT

Referring first to FIG. 1, a range pole combination 10, of my invention, comprised of a pole 15 comprised of three 4-foot (1.22 m) sections 11, 12, 13 is mounted in the earth 16 by means of a standard steel point 17 threaded onto the section 11. Alternate color zones of white 18 and orange 19, each one foot (0.306 m) long, coat the pole 15. A channel 21 (see, also, FIGS. 2–5) is mounted atop the section 11 by means of a threaded extension 22 of the section 12 passing through 9 hole 23 in a web 24 of the channel 21 and being screwed into a threaded opening 26 in the section 11. The section 12 has a lower flat planar surface 27 that is normal to the axis of the section and surrounds the extension 22, and the section 11 has an upper flat planar surface 28 that is normal to its axis and surrounds the threaded opening 26. Correspondingly, the web 24 has an upper flat face 29 parallel to a lower flat face 31. When the sections 12 and 11 are threaded together with the channel 21 between them the faces 29 and 31 are pressed against the respective surfaces 27, 28 to fix the channel 21 precisely normal to the pole 13. To make sure that the faces 29, 31 find a bearing on the end surfaces of the pole sections the hole 23 is made to closely fit the extension 22. A diameter of ⅝ inch (15.9 mm) typically fits a standard pole section.

The center of the hole 23 is on a centerline of the channel 21 and also on this centerline I have mounted a commercially available bulls-eye bubble level 32 by means of three sheet-metal screws 33, 34, 36. Other means of attaching the bubble level 32 to the web 24 are included within the scope of my invention and I have found that a double sided adhesive cloth commercially available from Manco Tape, Inc. of Cleveland, Ohio is wholly suitable. I have cut notches 37, 38 in the web 24 of my channel 21 and notches 39, 41 in flanges 43, 42 for the purpose of guiding a plumb line. Although I have preferred to use a channel to support the bulls-eye bubble level 32 other sections such as I-beams, angles or rigid plates might be used within the scope of my invention. The channel has the advantage of stiffness and the flanges 42, 43 offer physical protection to the level, particularly in transit. By virtue of the notches the level support 21 can serve as support means for a plumb line using the pole 13, itself, as a mount. This will be useful for short sightings where the plumb bob is suspended over a line or point and the telescope is focused on the vertical plumb line.

Following the color coding of the poles themselves I have coded edges of my channel 21, such as an edge 44 (FIG. 5) orange on one side 46, and white on another side 47 of the central notch 38. The similar notch 37 is cut in another, similarly coded, end 45 of the web 24, and plumb lines can be guided by these notches as well as the notches 39, 41 in the flanges. With the edge 44, 45 facing the telescope the color coded edge provides a precise means for centering the pole in the scope. For a similar purpose, I have color coded the outside surfaces of the flanges 42, 43 in contrasting colors from lines such as a line 49 (FIG. 3) marking the central line of the hole 23.

My new range pole and level combination has proven particularly useful when conveying surveyors and equipment to a site. The pole sections can be stocked indiscriminately in the truck or station wagon and the channels hung on wall pegs by means of the holes 23.

When a pole is assembled, regardless of its height, one channel is secured atop the bottom section. Upon disassembly this channel is again placed safely on its peg.

The foregoing description has been exemplary rather than definitive of my invention for which I desire an award of Letters Patent as defined in the appended claims.

I claim:

1. A combination of a sectionalized range pole and bubble-level indicating device therefor comprising:
    (A) a plurality of pole sections, each of said sections comprising two flat end surfaces normal to the length thereof, a threaded extension central to one of said surfaces and a matching threaded opening central to the other of said surfaces,
    (B) a bubble-level supporting member comprising opposing parallel flat faces, said member comprising a wall defining a hole through said faces, said extension passing through said hole and said faces pressing upon said surfaces when said sections are connected said bubble-level supporting member being precisely normal to said pole sections, and
    (C) a bubble-level mounted on said supporting member.

2. The combination of claim 1 wherein said supporting member comprises a channel having a web and two flanges.

3. The combination of claim 2 comprising a plumb line guiding notch in the web of said channel at an end thereof.

4. The combination of claim 2 comprising a plumb line guiding notch in a flange of said channel.

5. The combination of claim 1 wherein said supporting member comprises a plumb line guiding notch.

6. The combination of claim 1 wherein said supporting member comprises at least one edge, said edge being coded in a contrasting color on either side of a center point thereof.

7. The combination of claim 2 wherein an edge of said web is coded in a contrasting color on either side of a central point thereof.

8. The combination of claim 2 wherein a flange of said channel is coded in contrasting colors from a line marking the center line of said hole.

* * * * *